(12) United States Patent  (10) Patent No.: US 8,000,610 B2
Yao  (45) Date of Patent: *Aug. 16, 2011

(54) MONITORING MECHANISMS FOR OPTICAL SYSTEMS

(75) Inventor: Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/145,474

(22) Filed: Jun. 24, 2008

(65) Prior Publication Data

US 2009/0028565 A1  Jan. 29, 2009

Related U.S. Application Data

(63) Continuation of application No. 10/800,406, filed on Mar. 12, 2004, now Pat. No. 7,391,977.

(60) Provisional application No. 60/454,450, filed on Mar. 12, 2003, provisional application No. 60/493,880, filed on Aug. 8, 2003.

(51) Int. Cl.
*H04B 10/00* (2006.01)
*H04J 14/02* (2006.01)

(52) U.S. Cl. ............ 398/152; 398/79; 398/43; 359/483

(58) Field of Classification Search .............. 398/152, 398/149, 158, 79, 141, 43, 82; 359/483, 359/484, 485, 494, 497, 499, 259, 250, 279, 359/280, 301, 303; 356/368, 364, 367

See application file for complete search history.

(56) References Cited

U.S. PATENT DOCUMENTS

| 3,302,028 A | 1/1967 | Sterzer |
| 3,684,350 A | 8/1972 | Wentz |
| 3,719,414 A | 3/1973 | Wentz |
| 4,389,090 A | 6/1983 | LeFevre |
| 4,461,543 A | 7/1984 | McMahon |
| 4,798,436 A | 1/1989 | Mortimore |
| 5,004,312 A | 4/1991 | Shimizu |
| 5,111,322 A | 5/1992 | Bergano et al. |
| 5,153,676 A | 10/1992 | Bergh |
| 5,251,057 A | 10/1993 | Guerin et al. |
| 5,317,445 A | 5/1994 | DeJule et al. |
| 5,373,393 A | 12/1994 | DeJule et al. |
| 5,381,250 A | 1/1995 | Meadows |
| 5,473,457 A | 12/1995 | Ono |
| 5,475,525 A | 12/1995 | Tournois et al. |
| 5,561,726 A | 10/1996 | Yao |
| 5,611,005 A | 3/1997 | Heismann et al. |
| 5,627,645 A | 5/1997 | Imagawa et al. |
| 5,723,856 A | 3/1998 | Yao et al. |
| 5,751,747 A | 5/1998 | Lutes et al. |
| 5,777,778 A | 7/1998 | Yao |
| 5,796,510 A | 8/1998 | Yao |

(Continued)

OTHER PUBLICATIONS

Azzam, R.M.A., "Photopolarimeter using two modulated optical rotators", *Optics Letters*, 1(5):181-183, Nov. 1977.

(Continued)

*Primary Examiner* — M. R. Sedighian
(74) *Attorney, Agent, or Firm* — Perkins Coie LLP

(57) ABSTRACT

This application describes optical monitoring devices and applications in optical systems for monitoring various optical parameters of light, including the signal to noise ratio, the degree of polarization, and the differential group delay (DGD).

11 Claims, 13 Drawing Sheets

U.S. PATENT DOCUMENTS

| | | | |
|---|---|---|---|
| 5,835,270 A | 11/1998 | Urino et al. | |
| 5,917,179 A | 6/1999 | Yao | |
| 5,929,430 A | 7/1999 | Yao et al. | |
| 5,930,414 A | 7/1999 | Fishman et al. | |
| 5,978,125 A | 11/1999 | Yao | |
| 6,178,036 B1 | 1/2001 | Yao | |
| 6,181,728 B1 | 1/2001 | Cordingley et al. | |
| 6,229,937 B1 | 5/2001 | Nolan et al. | |
| 6,252,711 B1 | 6/2001 | Damask et al. | |
| 6,339,489 B1 | 1/2002 | Bruyere et al. | |
| 6,377,719 B1 | 4/2002 | Damask | |
| 6,388,785 B2* | 5/2002 | Havstad et al. | 398/158 |
| 6,389,197 B1 | 5/2002 | Ilchenko et al. | |
| 6,417,948 B1 | 7/2002 | Chowdhury et al. | |
| 6,417,957 B1 | 7/2002 | Yao | |
| 6,473,218 B1 | 10/2002 | Maleki et al. | |
| 6,476,959 B2 | 11/2002 | Yao | |
| 6,480,637 B1 | 11/2002 | Yao | |
| 6,487,233 B2 | 11/2002 | Maleki et al. | |
| 6,487,336 B1 | 11/2002 | Yao | |
| 6,488,861 B2 | 12/2002 | Iltchenko et al. | |
| 6,493,116 B1 | 12/2002 | Robinson et al. | |
| 6,493,474 B1 | 12/2002 | Yao | |
| 6,498,869 B1 | 12/2002 | Yao | |
| 6,535,328 B2 | 3/2003 | Yao | |
| 6,542,650 B2 | 4/2003 | Khosravani et al. | |
| 6,546,159 B1 | 4/2003 | Peng et al. | |
| 6,552,833 B2 | 4/2003 | Liu et al. | |
| 6,567,167 B1 | 5/2003 | Chou et al. | |
| 6,567,436 B1 | 5/2003 | Yao et al. | |
| 6,576,886 B1 | 6/2003 | Yao | |
| 6,577,445 B1 | 6/2003 | Damask | |
| 6,580,532 B1 | 6/2003 | Yao et al. | |
| 6,594,061 B2 | 7/2003 | Huang et al. | |
| 6,604,871 B2 | 8/2003 | Cao | |
| 6,628,850 B1 | 9/2003 | Yao | |
| 6,628,861 B1 | 9/2003 | Yao | |
| 6,628,862 B1 | 9/2003 | Yao | |
| 6,643,064 B2 | 11/2003 | Huang et al. | |
| 6,661,941 B1 | 12/2003 | Yao | |
| 6,671,464 B1 | 12/2003 | Kikuchi | |
| 6,687,423 B1 | 2/2004 | Yao | |
| 6,707,977 B2 | 3/2004 | Chien et al. | |
| 6,731,389 B2 | 5/2004 | Luscombe et al. | |
| 6,754,404 B2 | 6/2004 | Yao | |
| 6,795,481 B2 | 9/2004 | Maleki et al. | |
| 6,795,616 B2 | 9/2004 | Yao | |
| 6,836,327 B1 | 12/2004 | Yao | |
| 6,842,283 B2 | 1/2005 | Savory et al. | |
| 6,847,484 B2 | 1/2005 | Damask et al. | |
| 6,856,400 B1* | 2/2005 | Froggatt | 356/477 |
| 6,867,918 B2 | 3/2005 | Damask | |
| 6,873,631 B2 | 3/2005 | Yao et al. | |
| 6,873,783 B1 | 3/2005 | Yao | |
| RE38,735 E | 5/2005 | Yao | |
| 6,891,616 B2 | 5/2005 | Saitoh et al. | |
| 6,891,674 B2 | 5/2005 | Damask | |
| 6,900,932 B2 | 5/2005 | Chen et al. | |
| 6,937,798 B1 | 8/2005 | Yao et al. | |
| RE38,809 E | 10/2005 | Yao | |
| 6,975,454 B1 | 12/2005 | Yan et al. | |
| 7,027,135 B2 | 4/2006 | Fu et al. | |
| 7,027,198 B2 | 4/2006 | Yao | |
| 7,067,795 B1 | 6/2006 | Yan et al. | |
| 7,068,896 B1 | 6/2006 | Kath et al. | |
| 7,076,169 B2 | 7/2006 | Shpantzer et al. | |
| 7,079,247 B2 | 7/2006 | Shribak et al. | |
| 7,154,659 B1 | 12/2006 | Yao et al. | |
| 7,157,687 B1 | 1/2007 | Yao | |
| 7,218,436 B2 | 5/2007 | Yao | |
| 7,227,686 B1 | 6/2007 | Yan et al. | |
| 7,233,720 B2 | 6/2007 | Yao | |
| 7,245,952 B2 | 7/2007 | Cameron | |
| 7,265,836 B1 | 9/2007 | Yao | |
| 7,265,837 B1 | 9/2007 | Yao | |
| 7,301,632 B2 | 11/2007 | Hug | |
| 7,343,100 B2 | 3/2008 | Yao | |
| 7,372,568 B1 | 5/2008 | Yao | |
| 7,382,962 B1 | 6/2008 | Yao | |
| 7,391,977 B2* | 6/2008 | Yao | 398/152 |
| 7,436,569 B2 | 10/2008 | Yao et al. | |
| 7,466,471 B2 | 12/2008 | Yao | |
| 7,522,785 B2 | 4/2009 | Yao | |
| 7,534,990 B2 | 5/2009 | Yao | |
| 7,535,639 B2 | 5/2009 | Yao et al. | |
| 7,693,419 B1 | 4/2010 | Chen et al. | |
| 7,796,894 B1 | 9/2010 | Yao | |
| 2001/0052981 A1* | 12/2001 | Chung et al. | 356/364 |
| 2002/0015547 A1 | 2/2002 | Patel | |
| 2002/0075477 A1 | 6/2002 | Yu et al. | |
| 2002/0191265 A1 | 12/2002 | LaGasse et al. | |
| 2003/0007151 A1 | 1/2003 | Eckert | |
| 2003/0035120 A1 | 2/2003 | Myatt et al. | |
| 2003/0076588 A1 | 4/2003 | Savory et al. | |
| 2003/0081874 A1 | 5/2003 | Yao | |
| 2003/0156776 A1* | 8/2003 | Han et al. | 385/11 |
| 2003/0206689 A1 | 11/2003 | Jung et al. | |
| 2004/0037495 A1 | 2/2004 | Yao | |
| 2004/0247226 A1 | 12/2004 | Pyo et al. | |
| 2005/0041922 A1 | 2/2005 | Yao | |
| 2005/0129346 A1 | 6/2005 | Chen et al. | |
| 2005/0168659 A1 | 8/2005 | Melton | |
| 2005/0200941 A1 | 9/2005 | Yao | |
| 2005/0201751 A1 | 9/2005 | Yao | |
| 2005/0265728 A1 | 12/2005 | Yao | |
| 2006/0023987 A1 | 2/2006 | Yao | |
| 2006/0115199 A1 | 6/2006 | Yao | |
| 2006/0245706 A1 | 11/2006 | Kath et al. | |
| 2007/0223078 A1 | 9/2007 | Yao et al. | |
| 2007/0297054 A1 | 12/2007 | Yao et al. | |
| 2008/0030839 A1 | 2/2008 | Yao | |
| 2008/0054160 A1 | 3/2008 | Yao | |
| 2008/0138070 A1 | 6/2008 | Yan et al. | |
| 2008/0159692 A1 | 7/2008 | Yao | |
| 2009/0207409 A1 | 8/2009 | Yao | |
| 2009/0213453 A1 | 8/2009 | Yao | |
| 2009/0225420 A1 | 9/2009 | Yao et al. | |
| 2009/0238218 A1 | 9/2009 | Yao | |
| 2010/0239245 A1 | 9/2010 | Yao | |

OTHER PUBLICATIONS

Chipman, R.A., *Handbook of Optics*, vol. II, Chapter 22—Polarimetry, 2nd Ed. M. Bass ed., McGraw-Hill, New York, 1995.

Collett, E., *Polarized Light in Fiber Optics*, Chapters 15-16, The PolaWave Group, New Jersey, 2003.

Compain, E., et al., "General and Self-Consistent Method for the Calibration of Polarization Modulators, Polarimeters, and Mueller-Matrix Ellipsometers", *Applied Optics*, 38(16):3490-3502, Jun. 1999.

De Martino, A., et al., "Optimized Mueller polarimeter with liquid crystals", *Optics Letters*, 28(8):616-618, Apr. 2003.

Goldstein, D.H., et al., "Error analysis of a Mueller matrix polarimeter", *J. Opt. Soc. Am. A*, 7(4):693-700, Apr. 1990.

Goldstein, D.H., *Polarized Light*, Chapter 29, 2nd Ed., Marcel Dekker, New York, 2003.

Khosravani, R., et al., "Time and Frequency Domain Characteristics of Polarization-Mode Dispersion Emulators," *IEEE Photonics Technology Letters*, 13(2):127-129, Feb. 2001.

Rochford, K.B., et al., "Accurate Interferometric Retardance Measurements," *Applied Optics*, 36(25):6473-6479, Sep. 1997.

Sobiski, D., et al., "Fast first-order PMD compensation with low insertion loss for 10Gbit/s system," *Electronics Letters*, 37(1):46-48, Jan. 2001.

Wang, S.X., et al., "Fast wavelength-parallel polarimeter for broadband optical networks", *Optics Letters*, 29(9):923-925, May 2004.

Williams, P., "Rotating-Polarizer Polarimeter for Accurate Retardance Measurement," *Applied Optics*, 36(25):6466-6472, Sep. 1997.

Williams, P., "Rotating-Wave-Plate Stokes Polarimeter for Differential Group Delay Measurements of Polarization-Mode Dispersion", *Applied Optics*, 38(31):6508-6515, Nov. 1999.

Yan, L.-S., et al., "Experimental Importance Sampling Using a 3-Section PMD Emulator with Programmable DGD Elements," *Optical Fiber Communications Conference (OFC 2003)*, paper ThA4, 4 pages, Mar. 2003.

Yan, L.-S., et al., "High-Speed and Highly Repeatable Polarization-State Analyzer for 40-Gb/s System Performance Monitoring," *IEEE Photonics Technology Letters*, 18(4):643-645, Feb. 2006.

Yan, L.-S., et al., "High-Speed, Stable and Repeatable PMD Emulator with Tunable Statistics," *Optical Fiber Communication Conference (OFC 2003)*, paper MF6, 5 pages, Mar. 2003.

Yao, X. S., et al., "Highly repeatable all-solid-state polarization-state generator", *Optics Letters*, 30(11):1324-1326, Jun. 2005.

Lima, A.O., et al., "Statistical Analysis of the Performance of PMD Compensators Using Multiple Importance Sampling," IEEE Photonics Technology Letters, 15(12):1716-1718, Dec. 2003.

Damask, J.N., "A Programmable Polarization-Mode Dispersion Emulator for Systematic Testing of 10 Gb/s PMD Compensators," *Optical Fiber Communication Conference*, vol. 3, pp. 28-30, Mar. 2000.

Damask, J.N., et al., "Demonstration of a Coherent PMD Source," *IEEE Photonics Technology Letters*, 15(11):1612-1614, Nov. 2003.

Foschini, G.J., et al., "Probability Densities of Second-Order Polarization Mode Dispersion Including Polarization Dependent Chromatic Fiber Dispersion," *IEEE Photonics Technology Letters*, 12(3):293-295, Mar. 2000.

Hauer, M.C., et al., "Electrically Controllable All-Fiber PMD Emulator Using a Compact Array of Thin-Film Microheaters," *Journal of Lightwave Technology*, 22(4):1059-1065, Apr. 2004.

Karlsson, M., et al., "Autocorrelation function of the polarization-mode dispersion vector," *Optics Letters*, 24(14):939-941, Jul. 1999.

Kogelnik, H., et al., *Optical Fiber Telecommunications IV B Systems and Impairments*, Chapter 15 "Polarization-Mode Dispersion", pp. 725-861, I.P. Kaminow and T. Li, Eds. Academic Press, 2002.

Lee, J.H., et al., "Statistical PMD Emulator Using Variable DGD Elements," *Optical Communication Conference and Exhibit*, OFC 2002, pp. 375-376, Mar. 2002.

Lima, I.T., et al., "Comparison of Polarization Mode Dispersion Emulators," *Journal of Lightwave Technology*, 19(12):1872-1881, Dec. 2001.

Noé, R., et al., "Polarization Mode Dispersion Compensation at 10, 20, and 40 Gb/s with Various Optical Equalizers," *Journal of Lightwave Technology*, 17(9):1602-1616, Sep. 1999.

Willner, A.E., et al., "PMD Emulation," *Journal of Optical and Fiber Communications Research*, 1(3):181-200, Nov. 2004.

Yan, L.-S., et al., "Polarization-Mode-Dispersion Emulator Using Variable Differential-Group-Delay (DGD) Elements and Its Use for Experimental Importance Sampling," *Journal of Lightwave Technolology*, 22(4):1051-1058, Apr. 2004.

* cited by examiner

MONITORING MECHANISMS FOR OPTICAL SYSTEMS

This application is a continuation application of and claims priority to U.S. patent application Ser. No. 10/800,406, filed Mar. 12, 2004, now U.S. Pat. No. 7,391,977 which claims the benefits of U.S. Provisional Application Nos. 60/454,450 entitled "MONITORING MECHANISMS FOR OPTICAL SYSTEMS" and filed Mar. 12, 2003, and 60/493,880 entitled "SOP GENERATOR AND ANALYZER BASED ON TUNABLE OPTICAL POLARIZATION ROTATORS" and filed Aug. 8, 2003. The entire disclosures of the above-referenced applications are incorporated herein by reference as part of the disclosure of this application.

BACKGROUND

This application relates to optical monitoring in optical devices and systems.

Optical properties or parameters of light in an optical device or system may be measured for various purposes. As an example, such an optical measurement may be used to determine the performance or an operating condition of the device or system. An optical property or parameter of light under measurement may include the optical polarization, the signal to noise ratio, the differential group delay between two orthogonal polarization states, and others.

The optical polarization is an important parameter of an optical signal in various optical systems. For example, in fiber optic communication systems, polarization-dependent effects in fibers and other devices, such as polarization-dependent loss (PDL) and polarization-mode dispersion (PMD), can have significant impacts on performance and normal operations of optical devices or systems. Hence, it may be desirable to measure and monitor the degree of polarization (DOP) of an optical signal in these and others systems.

Similarly, the signal-to-noise ratio (SNR) and the differential group delay (DGD) of an optical signal are also important parameters and hence monitoring of these parameters may be desirable under certain circumstances.

SUMMARY

This application includes various implementations and examples of devices and techniques for monitoring the SNR, DOP, and DGD of one or more optical signals. In one implementation, an optical scrambler and a polarizer may be used in the optical path for the measurements. In another implementation, a rotatable quarter waveplate and a rotatable half waveplate are used in the optical path for the measurements. In yet another implementation, a state-of-polarization generator and a linear polarizer may be used for the measurements. The optical monitoring devices described here may be used to measure WDM channels.

These and other implementations and applications are described in greater detail in the attached drawings, the detailed description, and the claims.

DETAILED DESCRIPTION

Figure 1:
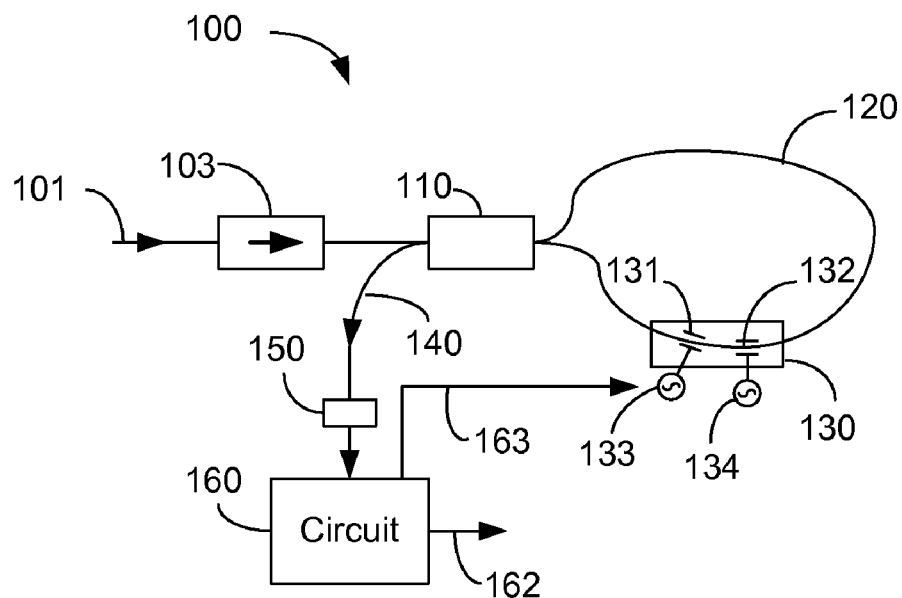
FIGS. 1 and 2 show two exemplary optical monitoring devices with a polarization scrambler or controller.

FIG. 1 illustrates one exemplary implementation of a monitoring device 100 for monitoring both SNR and DOP in the received light. The monitoring device 100 may use a fiber to receive an optical signal 101 under monitoring, and an optical loop 120 such as a fiber loop to perform the monitoring. An optical coupler 110, such as a 50% fiber coupler, may be coupled to the two ends of the fiber loop 120 to split the input signal 101 into two counter-propagating beams in the loop 120 and to combine the two counter-propagating beams to produce an output beam 140. Hence, the coupler 110 and the loop 120 provides a mirroring mechanism. A polarization scrambler or controller 130 is placed in the fiber loop 120 to either randomly scramble the polarization of light in the loop 120 or to systematically control the polarization to vary through all possible states of polarization so that a maximum power level and a minimum power level in the output beam 140 can be found. The scrambler or controller 130 may be optionally controlled in response to a control signal 163 to adjust the state of polarization of light passing therethrough.

In one implementation of the device 130 as illustrated in FIG. 1, the polarization scrambler or controller 130 may include two or more fiber squeezers 131 and 132 respectively under control of the controllers 133 and 134. The squeezing directions of the fiber squeezers 131 and 132 are oriented to be 45 degrees with respect to each other to perform the scrambling operations.

An optical detector 150 may be coupled to receive the output light 140 from the loop 120. An optional optical isolator 103 may be placed in the path of the input beam 101 to prevent any optical feedback to the input path. A processing circuit 160 is coupled to receive the detector output from the detector 150 to produce an output signal 162 which includes information about the SNR or DOP.

In operation, the detector 150 detects the maximum and the minimum optical power levels in the output signal 140. The processing circuit 160 can be designed to compute the extinction ratio based on measured maximum and the minimum optical power levels. In various applications, the signal 101 is generally polarized and the noise is not polarized. Hence, the extinction ratio can directly relate to the SNR and DOP. As the extinction ratio increases, the DOP and the SNR increase accordingly, and vice versa. The processing circuit 160 may also includes a control unit that controls the operation of the polarization scrambler 130.

Figure 2:
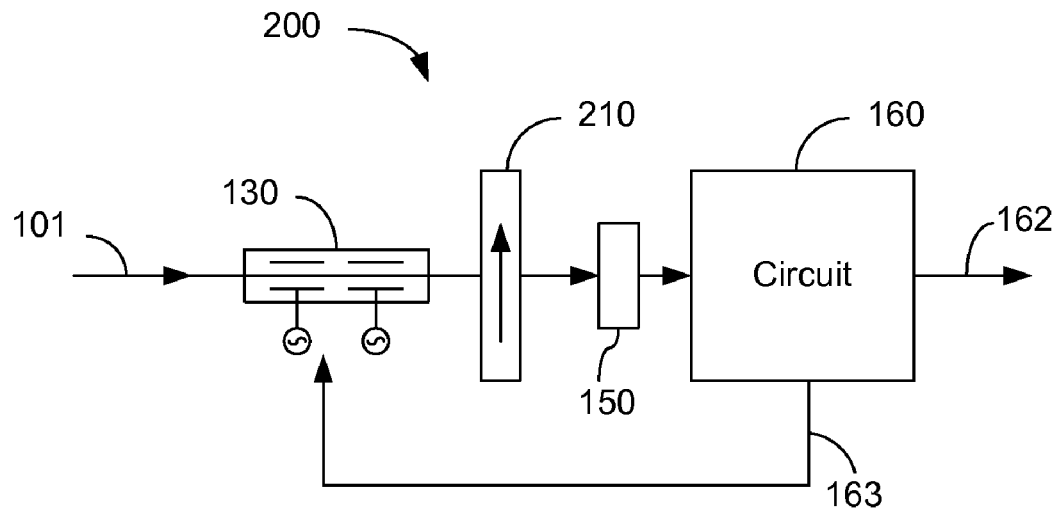

FIG. 2 shows a monitoring device 200 based on another implementation. The polarization scrambler 130 is placed to scramble the input light 101 and a polarizer 210 is used to transmit the output light of the scrambler 130. The polarizer 210 is used here to replace the mirroring loop 120 in the monitoring device 100 in FIG. 1. The optical detector 150 is then used to receive the transmitted light from the polarizer 210. The processing circuit 160 receives and processes the detector output to produce the output 162.

Figure 3:
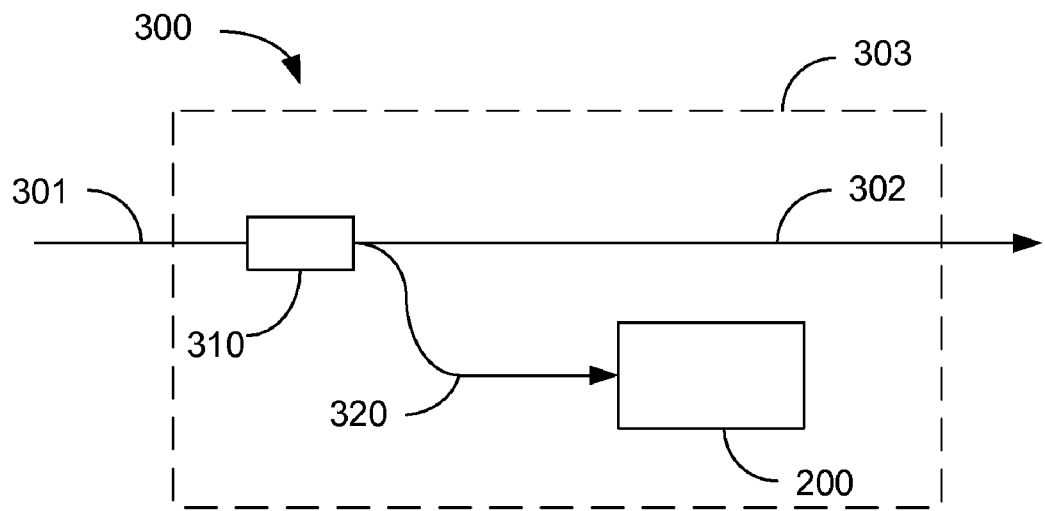
FIG. 3 shows an implementation of the monitoring device in FIG. 2 in a transmission system.

FIG. 3 shows an implementation of the monitoring device 200 in a transmission system 300. An optical coupler 310 is placed in the path of the input beam 301 to tap a fraction of the input 301 as a monitoring beam 320 and the remaining 302 of the input 301 continues along the input path as an output of the system 300. The monitoring device 200 is coupled to receive the monitoring beam 320 to perform the measurement. Notably, a housing 303 may be used to enclose the coupler 310, the path for the monitoring beam 320, and the monitoring device 200. All optical paths may be fibers, dielectric waveguides, or a combination of fiber paths and waveguide paths. The housing may be hermetically sealed to provide an integrated package for deployment in a fiber transmission line or system. A substrate may be used to fabricated waveguides and other optical components in a single-chip package enclosed within the housing 303. It is understood that, the monitoring device 100 in FIG. 1 may also be used to replace the device 200 in FIG. 3 and other systems shown in this application.

Figure 4:
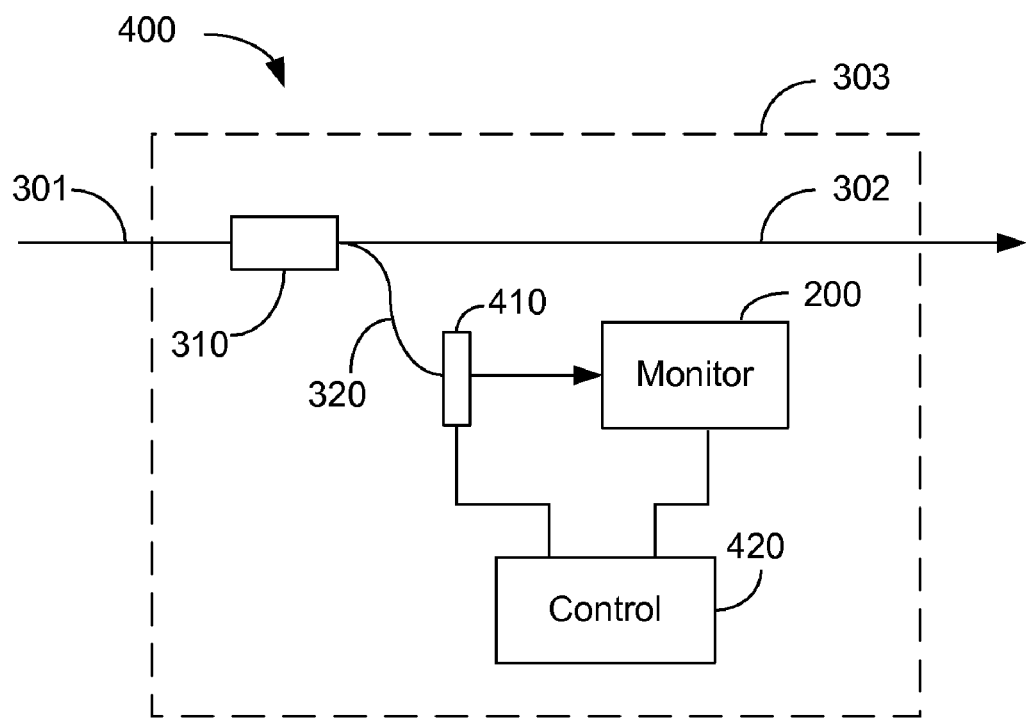
FIG. 4 shows a monitoring setup for a wavelength-division-multiplexed (WDM) transmission line where the input includes signals at different WDM wavelengths.

FIG. 4 shows a monitoring setup for a wavelength-division-multiplexed (WDM) transmission line where the input 301 includes signals at different WDM wavelengths. The coupler 310 may split all WDM signals at the input to produce the monitoring beam 320. A WDM coupler may be used as the coupler 310. A tunable optical filter 410 is coupled between the coupler 310 and the monitoring device 200 or 100 to sequentially filter the WDM signals so that only one signal at a single WDM wavelength is transmitted to the device 200 or 100. As the filter 410 is tuned sequentially through all signal wavelengths, one at a time, each and every WDM signal is measured by the device 200 or 100. A control device 420 may be implemented and coupled to the filter 410 and the monitoring device 200 or 100 to control such sequential filtering and monitoring operations. The tunable filter 410 may be implemented in a number of configurations, such as a tunable Fabry-Perot filter, a tunable fiber grating filter (e.g., coupled with a fiber stretcher), multiple filters with different transmission wavelengths on a rotation wheel which may be controlled by a step motor, and others.

Figure 5:
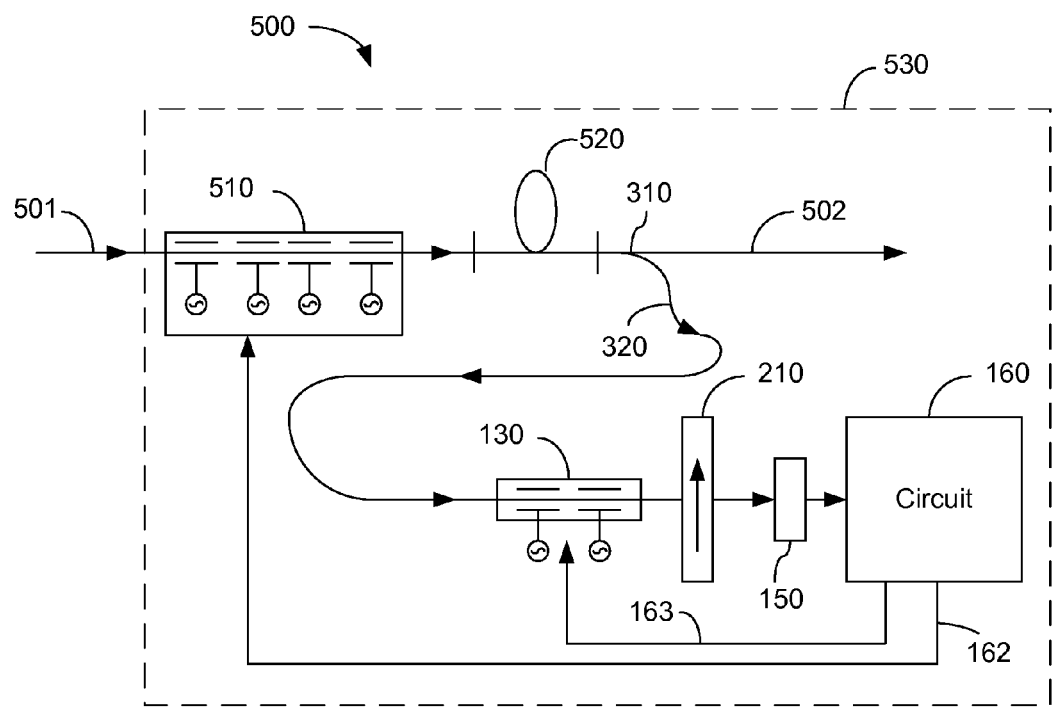
FIG. 5 shows one implementation of an all-fiber dynamic PMD controller 500 based on the above monitoring techniques.

FIG. 5 shows one implementation of an all-fiber dynamic PMD controller 500 based on the above monitoring techniques. An adjustable polarization controller 510 is coupled in the input fiber to control the polarization of the input beam 501. A polarization-maintaining fiber segment 520 is coupled to the output of the polarization controller 510 to produce the desired differential group delay in the output light from the controller 510. Fiber fusion splicing may be used to connect the PM fiber segment 510. A fiber coupler 310 is used to split the output of the controller 510 into an output beam 502 in the input fiber and a monitoring beam 320 to the monitoring device 200 in FIG. 2 (or the device 100 in FIG. 1) for monitoring the degree of polarization. The circuit 160 is coupled to supply the output 162 to control the polarization controller 510 so that the polarization controller 510 can be dynamically adjusted in response to the measurement by the circuit 160. The polarization controller 510 may be implemented in various configurations. The PMD controller 500 may include multiple, e.g., three or more, fiber squeezers. U.S. Pat. No. 6,493,474 to Yao on Dec. 10, 2002 discloses some examples based on four sequential fiber squeezers and is incorporated herein in its entirety as part of this application.

The system in FIG. 5 may be used to achieve a number of advantages, such as low optical loss at less than 0.5 dB and low cost due to the unique designs based on simple optical layout and simple components. A hermetically-sealed housing 530 may be implemented as illustrated.

Figure 6:
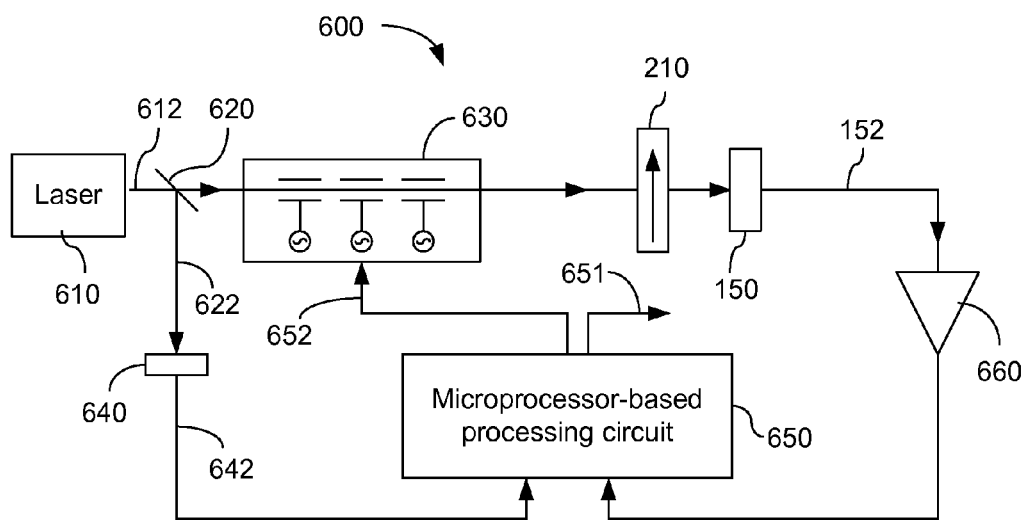
FIG. 6 shows one implementation of a microprocessor-based monitoring device.

FIG. 6 shows one implementation of a microprocessor-based monitoring device 600. A polarization controller 630 is used to adjust the SOP of the input light 612 under monitoring and a polarizer 210 is used to transmit the output light of the controller 630 to an optical detector 150. The output signal 152 from the detector 150 may be electrically amplified by an amplifier 660 and the amplified signal is sent to a microprocessor-based processing circuit 650. The processing circuit 650 converts each received analog signal into digital bits and performs the signal processing operations by using a microprocessor in the digital domain. An output 651 is then produced to indicate the monitoring result on either the DOP or the SNR of the light 612. As illustrated, a laser 610 or other light source may be used to produce the input light 612.

Optionally, a beam splitter 620, such as a fiber coupler, may be used to split a fraction of the input beam 612 as a reference beam 622 to a second optical detector 640. This beam splitter 620 should be insensitive to the light polarization. The output 642 of the second detector 640 is then fed into the circuit 650 for processing. This reference beam 622 provides a measurement of the power variation in the input beam 612 so that a part of the variation in the received signal 152 caused by the power variation alone may be deducted from the variation caused by the polarization change caused by the scrambler 630.

In operation, the circuit 650 may produce a control signal 652 to adjust the controller 630 in search for the maximum power ($V_{max}$) and the minimum power ($V_{min}$) at the detector 150. The control signal 652 may be digitally generated by the microprocessor and then converts into an analog signal. Based on measurements on the Vman and Vmin, the processor in the circuit 650 computes the DOP or SNR of the light. The DOP may be computed as follows:

$$DOP = \frac{V_{max} - V_{min}}{V_{max} + V_{min}}.$$

The polarization controller 630 may use a two-squeezer design as the element 130 in FIG. 1 or a three-squeezer design as illustrated in FIG. 6, or five- or six-squeezers to provide increased control in adjusting the SOP of input light. FIG. 6 shows a termination design where the input beam is entirely used for the monitoring operation. Alternatively, the monitoring device 600 may be implemented as an in-line package similar to the design in FIG. 3 where an additional splitter 310 is used to split the main input beam 301 to produce the input to the monitoring device 600 and the remaining of the main input beam continues to propagate in the transmission system.

In the above and other monitoring devices in this application, a tunable optical filter may be inserted in the input path to allow for sequential monitoring of different WDM channels in the input. FIG. 4 shows one example. This multi-channel technique based on a tunable filter can be implemented in various monitoring devices of this application. However, this technique is limited to sequential monitoring of one channel at a time.

Figure 7:
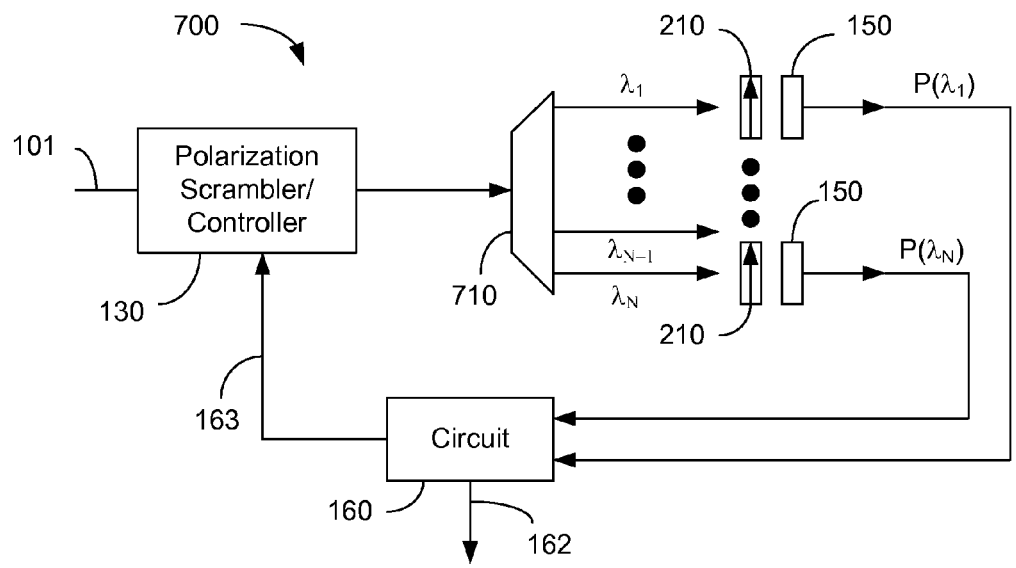
FIG. 7 shows a monitoring device that uses a WDM demultiplexer in the output of the polarization scrambler or controller to separate different WDM channels.
Figure 8:
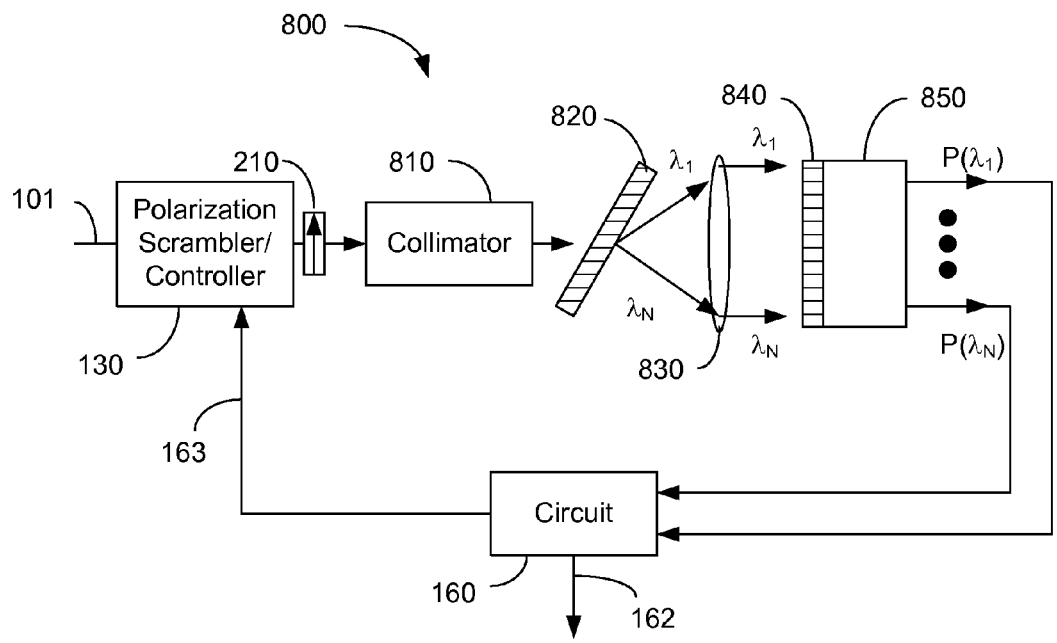
FIG. 8 shows another implementation where a diffraction grating is used to separate different WDM channels.

FIGS. 7 and 8 illustrate two multi-channel monitoring techniques for simultaneous monitoring of different WDM channels. Such techniques allows for taking snap shots of different channels at the same time.

FIG. 7 shows a monitoring device 700 that uses a WDM demultiplexer 710 in the output of the polarization scrambler or controller 130 to separate different WDM channels. In the optical path of each separate WDM channel, a polarizer 210 and an optical detector 150 are used to receive and detect the power levels of each channel. Hence, power levels of different channels can be measured at the same time. The output signals from the detectors 150 are then fed into the circuit 160 for data processing to monitor the WDM channels. Multiple polarizers 210 are placed in the optical paths between the dmux 710 and the detectors 150. Alternatively, a single polarizer may be placed between the polarization scrambler 130 and the WDM demultiplxer 710 to replace with multiple polarizers 210 in front of the detectors 150.

FIG. 8 shows another implementation 800 where a diffraction grating 820 is used to separate different WDM channels. A collimator 810 is used to receive the output of the polarization scrambler 130 to produce a collimated output. A polarizer 210 is placed between the polarization scrambler 130 and the collimator 810. The grating 820 diffracts the input light at different WDM wavelengths at different diffraction angles. This diffraction spatially separates different WDM channels. A second collimator 830, such as a lens, is used to collect the diffracted beams of different channels and focus the diffracted beams onto different detector elements of an array of optical detectors 840. A processing circuit 850 may be optionally used to condition the detector output signals prior to the circuit 160.

The above monitoring devices based on a polarization scrambler may be sensitive to the PMD in the input signal that includes two or more WDM channels. This sensitivity on the PMD may cause an error in the measurement. In general, the greater the PMD in the input, the larger the error of the monitoring device. Hence, it may be desirable to mitigate this PMD effect in monitoring the DOP or SNR.

Figure 9:
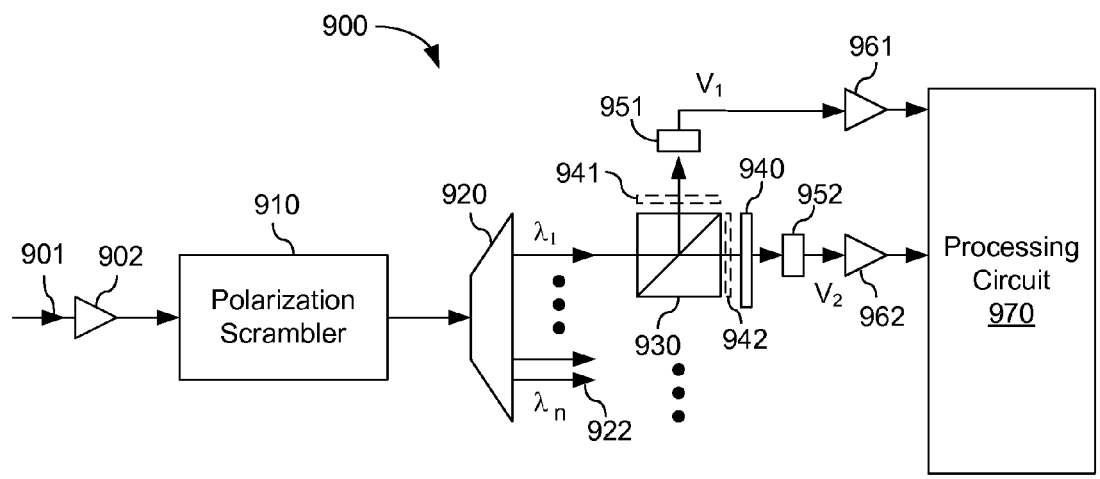
FIG. 9 shows one implementation of a PMD-insensitive monitoring device for WDM applications where only a single polarization scrambler is used for all wavelength channels.

FIG. 9 shows one implementation of a PMD-insensitive monitoring device 900 for WDM applications where only a single polarization scrambler is used for all wavelength channels. The device 900 includes a universal polarization scrambler 910 to receive input WDM channels in an input fiber 901. One or more optical amplifiers 902 may be used in the input optical path to amplify the input WDM channels. A WDM demultiplexer 920 is used to receive the output from the scrambler 910 and to split different WDM channels by their wavelengths as separate optical output signals 922. In each optical output, a polarizing beam splitter (PBS) 930 or a suitable polarization device is used to split the received light based on their two orthogonal polarizations to produce two beams with orthogonal polarizations. A bandpass filter 940 is used to filter one of the two outputs of the PBS 930 so that the power levels of the noise power levels in two output beams are different while the power levels of the signals in the output beams are essentially unaffected by the filtering. As illustrated, the filter 940 may be positioned to filter light from the port that transmits light along the direction of the input beam.

The above optical filtering causes an imbalance between the noise power levels in the two output beams with orthogonal polarizations. This imbalance is used for simultaneous and independent monitoring of both SNR and DOP. Two orthogonally oriented polarizers 941 and 942 may be optionally placed at the two output ports of the PBS 941 to ensure the output beams are orthogonally polarized. Two optical detectors 951 and 952 are positioned to receive the two outputs of the PBS 930, respectively. The output signals of the detectors 951 and 952 are fed into a processing circuit 970 for measurements and data processing. Two electrical signal amplifiers 961 and 962 may be optionally used to amplify the detector outputs, respectively, prior to the processing by the circuit 970.

In one implementation, the bandpass filter 940 may have a bandwidth broader than the actual bandwidth of each signal channel to allow each signal channel to pass without filtering but narrower than the bandwidth of the WDM device for each channel to filter out some noise components to create the power imbalance in the noise between the two output beams. For example, for WDM channels with a 100 GHz in the channel spacing and 10 GHz in the channel bandwidth, the WDM demultiplexer 920 may be designed to have a channel bandwidth 50 GHz. The bandpass filter 940 may have a bandwidth of 25 GHz, between the 10-GHz channel bandwidth and 50-GHz device channel bandwidth, to allow a channel to pass without being filtered. However, the noise components outside the 25 GHz window are filtered out in the transmitted beam of the PBS 930.

The maximum and minimum detected power of all SOP detected at the two detectors 951 and 952 are:

$$\begin{cases} V_1^{max} = G_1[P_s(1-\delta) + 0.5P_N] & (1) \\ V_1^{min} = G_1[P_s\delta + 0.5P_N] & (2) \\ V_2^{max} = G_2[P_s(1-\delta) + 0.5\alpha P_N] & (3) \\ V_2^{min} = G_2[P_s\delta + 0.5\alpha P_N] & (4) \end{cases}$$

where $P_s$ is the signal power, $P_N$ is the noise power, $\alpha$ is less than 1 and is the noise power filtering factor of the bandpass filter 940, and $\delta$ the depolarization factor caused by, e.g., the PMD in the input signal, the nonlinear birefringence, and imperfection of the PBS 930. Notably, in absence of the filter 940 which produces the an imbalance between the two output beams from PBS 930, the Eqs. (1) and (2) would be identical to Eqs. (3) and (4). The filter 940 is specifically used to break the degeneracy and to provide separate measures of SNR and DOP.

Equations (1) and (2) are added to obtain the following:

$$V_1^{max} + V_1^{min} = G_1(P_S + P_N) \quad (5),$$

Equations (1) and (2) are subtracted:

$$V_1^{max} - V_1^{min} = G_1 P_S(1 - 2\delta) \quad (6).$$

Similar manipulations of Equations (3) and (4) yield:

$$V_2^{max} + V_2^{min} = G_2(P_S + \alpha P_N) \quad (7)$$

$$V_2^{max} - V_2^{min} = G_2 P_S(1 - 2\delta) \quad (8)$$

Additionally, the following signal processing can be carried out:

$$G_2 \cdot Eq. (5) - G_i \cdot Eq. (7) = G_2(V_1^{max} + V_1^{min}) - G_1(V_2^{max} + V_2^{min})$$
$$= G_1 G_2 P_S + G_1 G_2 P_N - G_1 G_2 P_S - \alpha G_1 G_2 P_N.$$

Hence, the following can be obtained:

$$G_1 G_2(1 - \alpha) P_N = G_2(V_1^{max} + V_1^{min}) - G_1(V_2^{max} + V_2^{min}), \quad (9)$$

and $$P_N = \frac{1}{1 - \alpha} \left[ \frac{V_1^{max} + V_a^{min}}{G_1} - \frac{V_2^{max} + V_2^{min}}{G_2} \right]$$

From Eq. (5), the following can be derived:

$$G_1 P_S = (V_1^{max} + V_1^{min}) - G_1 P_N$$
$$= (V_1^{max} + V_1^{min}) - \frac{1}{1 - \alpha} \left[ (V_1^{max} + V_1^{min}) - \frac{G_1}{G_2}(V_2^{max} + V_2^{min}) \right]$$
$$= \left(1 - \frac{1}{1-\alpha}\right)(V_1^{max} + V_1^{min}) + \frac{\frac{G_1}{G_2}}{1-\alpha}(V_2^{max} + V_2^{min})$$
$$= \frac{1}{1-\alpha}\left[\frac{G_1}{G_2}(V_2^{max} + V_2^{min}) - \alpha(V_1^{max} + V_1^{min})\right].$$

Therefore, the following expressions can be derived:

$$P_S = \frac{1}{1-\alpha}\left[\frac{V_2^{max} + V_2^{min}}{G_2} - \frac{\alpha}{G_1}(V_1^{max} + V_1^{min})\right] \quad (10)$$

$$S/N = \frac{P_S}{P_N}$$
$$= \frac{\frac{V_2^{max} + V_2^{min}}{G_2} - \frac{\alpha}{G_1}(V_1^{max} + V_1^{min})}{\frac{V_1^{max} + V_1^{min}}{G_1} - \frac{V_2^{max} + V_2^{min}}{G_2}}$$
$$= \frac{G_1(V_2^{max} + V_2^{min}) - \alpha G_2(V_1^{max} + V_1^{min})}{G_2(V_1^{max} + V_1^{min}) - G_1(V_2^{max} + V_2^{min})}.$$

Let $\overline{V}_1 = \frac{1}{2}(V_1^{max} + V_1^{min})$, and $\overline{V}_2 = \frac{1}{2}(V_2^{max} + V_2^{min})$, the SNR can be computed as follows:

$$\frac{S}{N} = \frac{G_1 \overline{V}_2 - \alpha G_2 \overline{V}_1}{G_2 \overline{V}_1 - G_1 \overline{V}_2}. \quad (12)$$

If $G_1 = G_2$, then SNR becomes $$\frac{S}{N} = \frac{\overline{V}_2 - \alpha \overline{V}_1}{\overline{V}_1 - \overline{V}_2}.$$

Hence, the signal to noise ratio only depends on the average $V_1$ and $V_2$. This approach essentially excludes all the effects of PMD, the nonlinear birefringence, and the PBS imperfection.

From Equations (6), (9), and (10), the depolarization factor $\delta$ can be calculated as:

$$G_1 P_S(1 - 2\delta) = V_1^{max} - V_1^{min},$$

$$1 - 2\delta = \frac{1}{G_1 P_S}(V_1^{max} - V_1^{min}),$$

and $$\delta = \frac{1}{2}\left[1 - \frac{1}{G_1 P_S}(V_1^{max} - V_1^{min})\right]$$
$$= \frac{1}{2}\left[1 - \frac{(1-\alpha)(V_1^{max} - V_1^{min})}{\frac{G_1}{G_2}(V_2^{max} + V_2^{min}) - \alpha(V_1^{max} + V_1^{min})}\right].$$

For $G_1 = G_2$, the depolarization factor can be simplified as:

$$\delta = \frac{1}{2}\left[1 - \frac{(1-\alpha)(V_1^{max} - V_1^{min})}{2(\overline{V}_2 - \alpha \overline{V}_1)}\right].$$

The contribution to $\delta$ from the imperfection of the PBS 930 can be eliminated by placing polarizers 941 and 942 at the outputs of the PBS 930 in FIG. 9. Accordingly, the depolarization caused by PMD can be precisely measured. This mechanism may also be used to monitor PMD effect.

Figure 10:
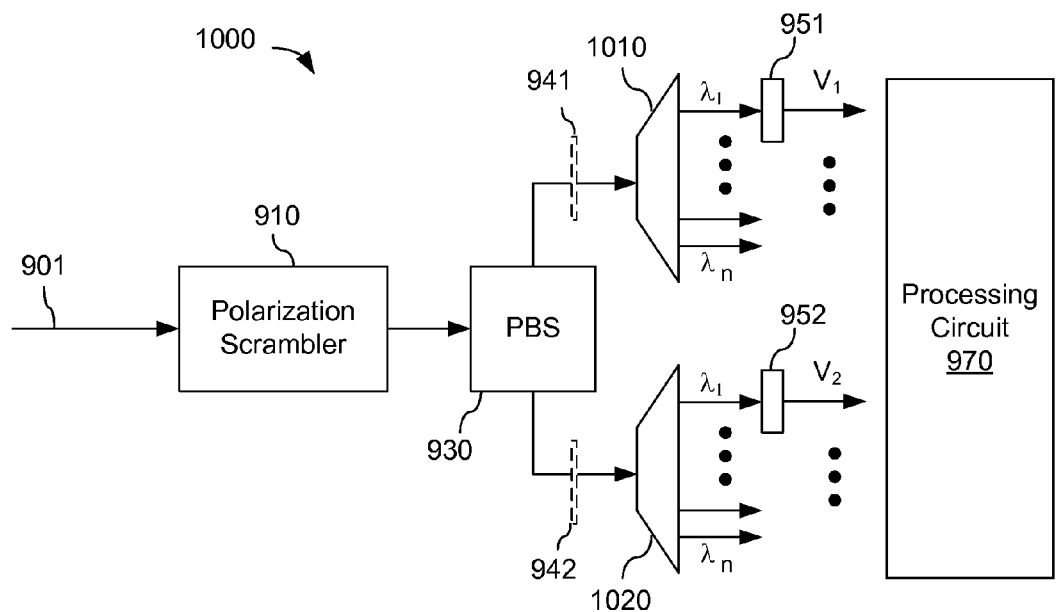
FIG. 10 shows another implementation of a WDM monitoring device where a single polarization beam splitter is combined with two WDM demultiplexers.

The device in FIG. 9 uses multiple PBSs for the separated WDM channels. Alternatively, FIG. 10 shows another implementation 1000 where a single PBS 930 is combined with two WDM demultiplexers 1010 and 1020. In this design, the two demultiplexers 1010 and 1020 may be purposely designed to be different to introduce the noise power imbalance with a factor of $\alpha(\lambda i)$ (i=1, 2, . . . , N). For example, the device channel bandwidths of the two demultiplexers 1010 and 1020 may be different, e.g., one is 50 GHz and the other is 75 GHz for WDM signals with a channel bandwidth of 10 GHz and a channel spacing of 100 GHz, where each WDM channel transmits without being attenuated but the noise power levels of the same channel in the outputs of the demultiplexers 1010 and 1020 are different. Hence, the filter 940 in FIG. 9 may be eliminated. If the two demultiplexers 1010 and 1020 are identical, then the filtering is needed to introduce the power imbalance.

Figure 11:
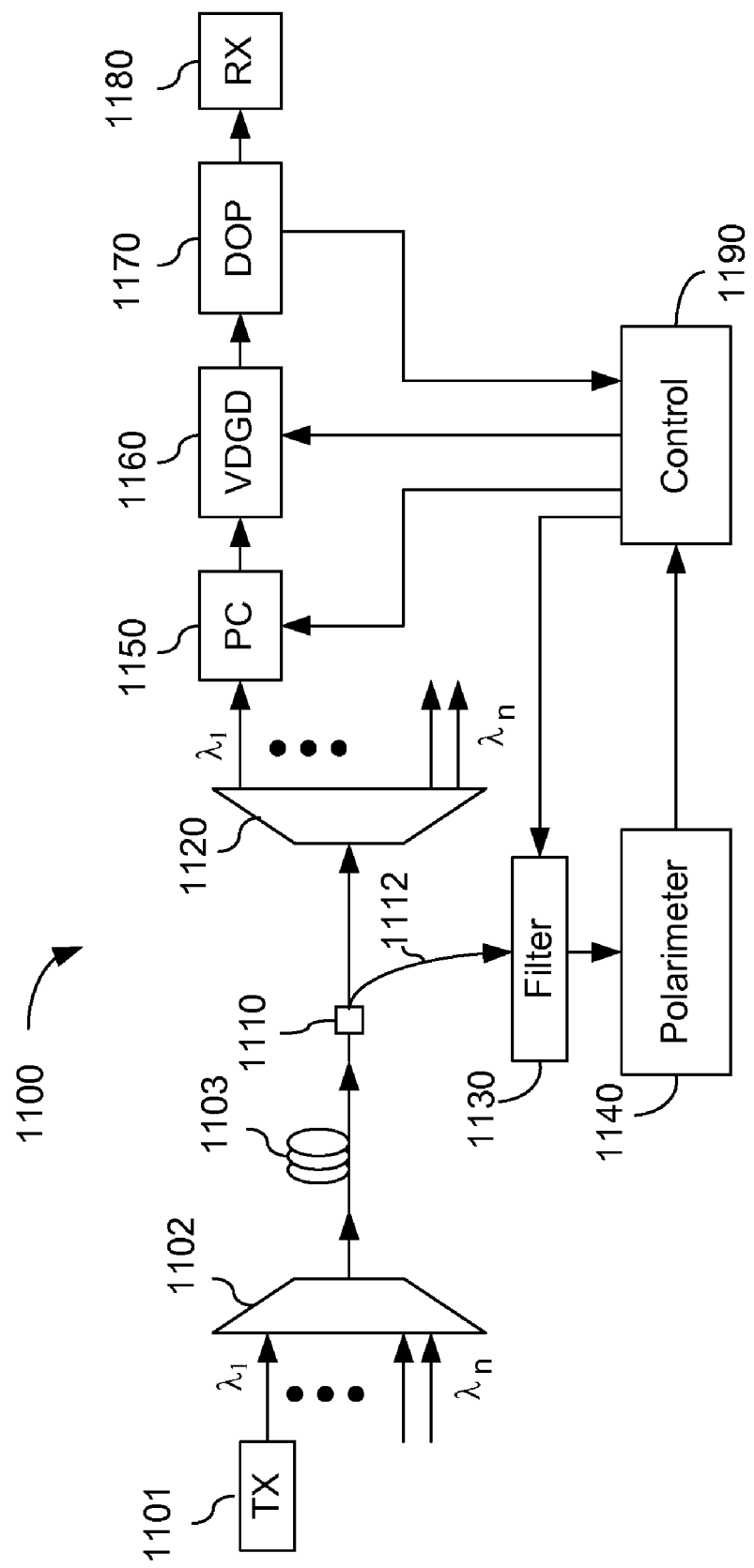
FIG. 11 shows a system having a real-time DGD monitoring device and a dynamic PMD compensator.

Now turning to FIG. 11, a real-time DGD monitoring mechanism is shown in the fiber system 1100 and is used in connection with a dynamic PMD compensator. The fiber system includes three main modules: a transmitter terminal, the fiber transmission line 1103 which may include a fiber link with optical amplifiers, and a receiving terminal. The transmitter terminal may include multiple optical transmitters 1101 at different channel wavelengths and a WDM multiplexer 1102 to multiplex the different channels for transmission in the fiber link 1103. The receiving terminal includes a DGD monitor, a demultiplexers 1120, dynamic PMD compensators for different channels, and optical receivers 1180 for different channels. An optical coupler 1110, such as a fiber coupler, may be placed in the input of the demultiplexer 1120 to split a fraction of the input signal as a monitor beam 1112 to the DGD monitor and the main input signal is received by the demultiplexer 1120.

The DGD monitor in the system 1100 includes a tunable filter 1130, a polarimeter 1140, and a DGD processing circuit within a control unit 1190. The filter 1130 is tuned to sequentially scan through different WDM or DWDM channels to allow for different channels to reach the polarimeter 1140, one at a time. The bandwidth of the filter 1130 is sufficiently narrower than the bandwidth of each channel. The polarimeter 1140 is operable to measure the SOP at a high speed for the real-time monitoring. The DGD processing circuit within the control unit 1190 receives and processes the SOP signal generated by the polarimeter 1140 to determine the DGD in each channel.

In operation, the tunable filter 1130 is tuned to a channel at its center wavelength λi and is scanned around λi for a duration longer than the time for the polarimeter 1140 to measure the SOP of that channel. During this scanning around λi, the polarimeter processes the input optical signal at λi to produce the information on the SOP of this channel.

Figure 12:
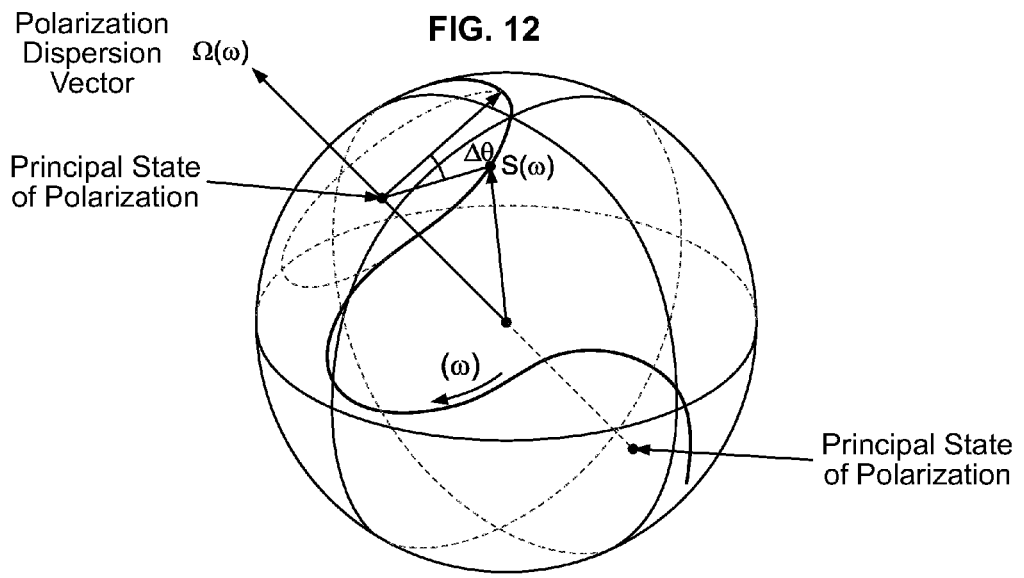
FIG. 12 illustrates the processing operation by a DGD processing circuit in FIG. 11 with reference to the Poincaré sphere for the polarization.

FIG. 12 illustrates the processing operation by the DGD processing circuit with reference to the Poincaré sphere for the polarization. Let the angular variation in the SOP angle around the principal axis Ω be Δθi for the channel λi, and the frequency tuning range around the center wavelength λi be Δfi, the DGD can be calculated as follows:

$$\Delta \tau_i = \frac{\Delta \theta_i}{2\pi \Delta f_i}.$$

This calculation is performed by the DGD processing circuit. FIG. 12 shows that, both the DGD and direction of the principal axis Ω can be determined.

Next, the control unit 1190 uses the DGD information to control the PMD compensator to produce a DGD that negates this measured DGD. This completes the monitoring and control operation on one channel. The control unit 1190 then commands the filter 1130 to tune to the next channel to repeat the monitoring and compensation operation. This process repeats for all channels sequentially.

The DGD monitoring mechanism in FIG. 11 is shared by all channels. The PMD compensation, however, is implemented individually for each channel. Hence, multiple PMD compensators are used in the example in FIG. 11 for different channels, respectively. Only one compensator for the channel λ1 is depicted for simplicity.

In the optical path for each channel after the demultiplexer 1120, the PMD compensator for that channel is placed before a respective channel receiver 1180. The PMD compensator may include an optical polarization controller (PC) 1150, a variable DGD (VDGD) element 1160 to produce a variable DGD, a DOP monitor 1170 for measuring the degree of polarization of the light, and a PMD control circuit within the control unit 1190. The polarization controller 1150 may use various implementations, including the fiber-squeezer controllers disclosed in the incorporated U.S. Pat. No. 6,493,474. The DOP monitor 1170 may be configured to tap a portion of the signal for the monitoring operation and send the remaining signal to the channel receiver 1180. As illustrated, the PMD control circuit controls both the polarization controller 1150 and the variable DGD element 1160 in response to the measured DOP from the monitor 1170. Hence, the control is a feedback control and operates dynamically to produce real-time PMD compensation. In implementations, a microprocessor may be used in the control unit 1190 to perform the computations for the DGD measurement and the PMD compensation.

Figure 13:
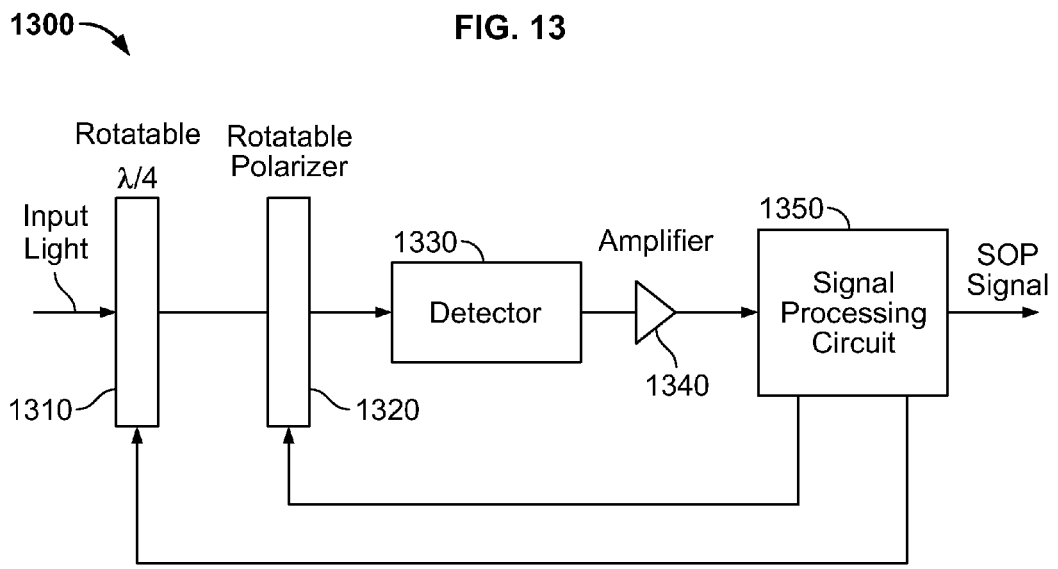
FIGS. 13, 14, and 15 show three examples of optical monitoring devices that use a rotatable quarter waveplate and a rotatable polarizer as a polarization scrambler.

The polarimeter 1140 in FIG. 11 may be implemented in various configurations. FIG. 13 shows one exemplary implementation 1300 by using a rotatable quarter-wave plate 1310 and a rotatable polarizer 1320 to sequentially process input light. The plates 1310 and 1320 are controlled, e.g., by the circuit 1350, to rotate at different rotational speeds or frequencies. In this and other implementations, the rotatable wave plate 1310 may be replaced by a polarization controller such as the fiber-squeezer controller disclosed in the attached U.S. Pat. No. 6,493,474. An optical detector 1330 converts the processed light into a detector signal and a signal processing circuit 1350 further processes the detector signal to measure the SOP of the light. A signal amplifier 1340 may be optionally coupled between the detector 1330 and the circuit 1350 to amplify the signal. Hence, in the configuration in FIG. 11, as the filter 1130 scans through different channels, the polarimeter 1300 measures the SOP one channel at a time. Alternatively, the configuration in FIG. 11 may be modified to place the tunable filter 1130 between the detector 1330 and the polarizer 1320 of the polarimeter 1300.

Figure 14:
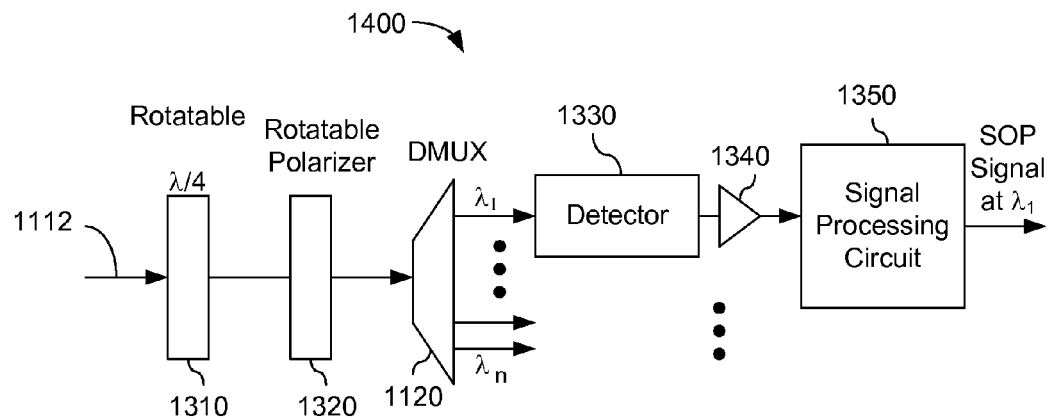
Figure 15:
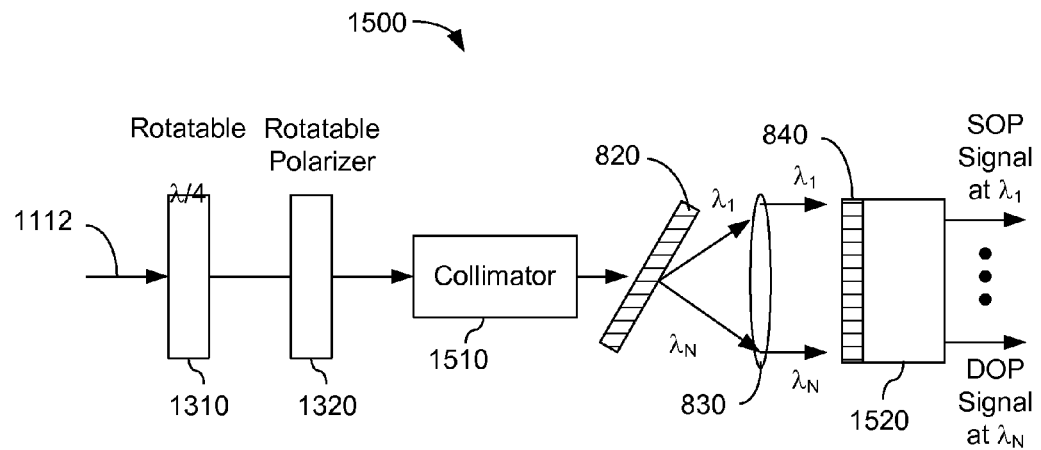

A polarimeter may also be configured to measure SOP of multiple channels in parallel at the same time. FIGS. 14 and 15 show two examples. In FIG. 14, the polarimeter 1400 uses a demultiplexer 1120 to separate different channels output by the quarter-wave plate 1310 and the polarizer 1320. For each channel, a designated optical detector 1330 and a designated signal processing circuit 1350 are used to process the channel signal to determine the SOP of that channel. Hence, all channels are monitored in parallel with one another at the same time.

FIG. 15 shows a different design 1500 where a diffraction grating 820 and a collimating lens 830 are used to spatially separate the different channels in a manner similar to the design in FIG. 8 for a different application. A processing circuit 1520 is used to process the detector outputs to produce the SOP signals for different channels.

In absence of PMD in an input optical signal, the SNR of the signal can be directly determined from the DOP measurement. Assume $P_s$ is the power of the signal which is polarized and $P_n$ is the power of the noise which is unpolarized. The DOP can be computed by the following equation:

$$DOP = \frac{P_s}{P_s + P_n} = \frac{P_s/P_n}{1 + P_s/P_n}.$$

Accordingly, the SNR can be computed from DOP:

$$SNR = \frac{P_s}{P_n} = \frac{DOP}{1 - DOP}.$$

Here, the DOP can be computed from the maximum and minimum power levels from the measurements. When DOP is 1, the SNR is infinite and when DOP is zero, the SNR is zero.

Figure 16:
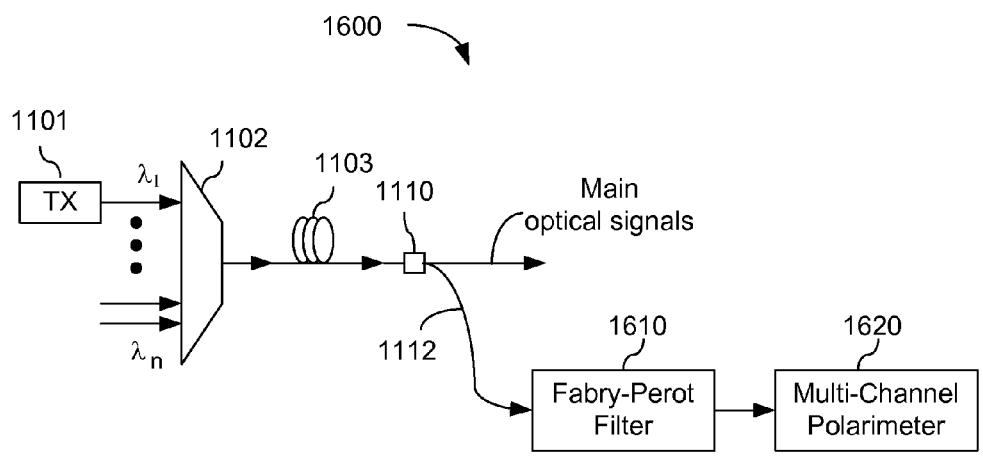
FIG. 16 shows a fiber system that uses a Fabry-Perot filter and sequential or parallel multi-channel polarimeters to monitor the SOP of each channel.
Figure 17:
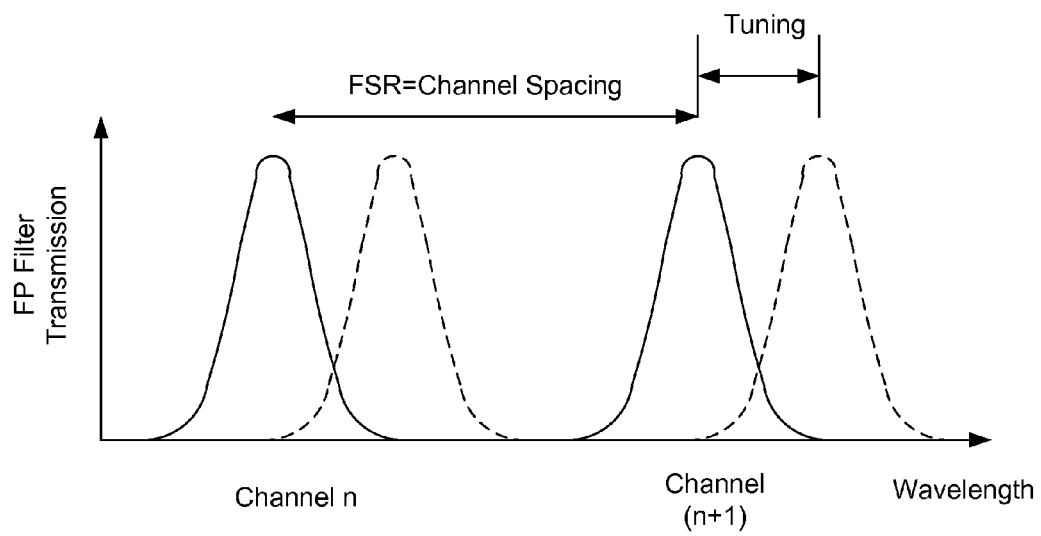
FIG. 17 illustrates operations of the Fabry-Perot filter in FIG. 16.

FIG. 16 shows a fiber system 1600 that uses any one of the above sequential or parallel multi-channel polarimeters to monitor the SOP of each channel. A fiber coupler 1110 is used to split a fraction of the input light with multiple channels to produce a monitor beam 1112. A tunable Fabry-Perot filter 1610 is used to filter the monitor beam 1112 to transmit all WDM channels at the same time to a multi-channel polarimeter 1620. This may be accomplished by designing the Fabry-Perot filter 1610 to have a free spectral range (FSR) equal to the channel spacing of the WDM channels or a multiplicity of the channel spacing. In operation, the tunable Fabry-Perot filter 1610 is tuned to measure the DGD as illustrated in FIG. 12. FIG. 17 further shows the spectrum of the filter 1610 where a tuning in the filter 1610 causes the same amount of frequency shift in the transmission of all channels. The polarimeter 1620 may be a sequential multi-channel polarimeter having a tunable filter or a parallel multi-channel polarimeter as shown in FIGS. 14 and 15.

In some WDM systems, the channel spacing may be 50 GHz, 100 GHz, or 200 GHz. Assuming the finesse of the filter 1610 is 100, the resolution bandwidth of the filter is 1 GHz and should be sufficient to resolve the spectrum of a 10 Gb/s signal. As described above, the DGD of each channel can be calculated based on the measured SOP in each channel as illustrated in FIG. 12.

Figure 18A:
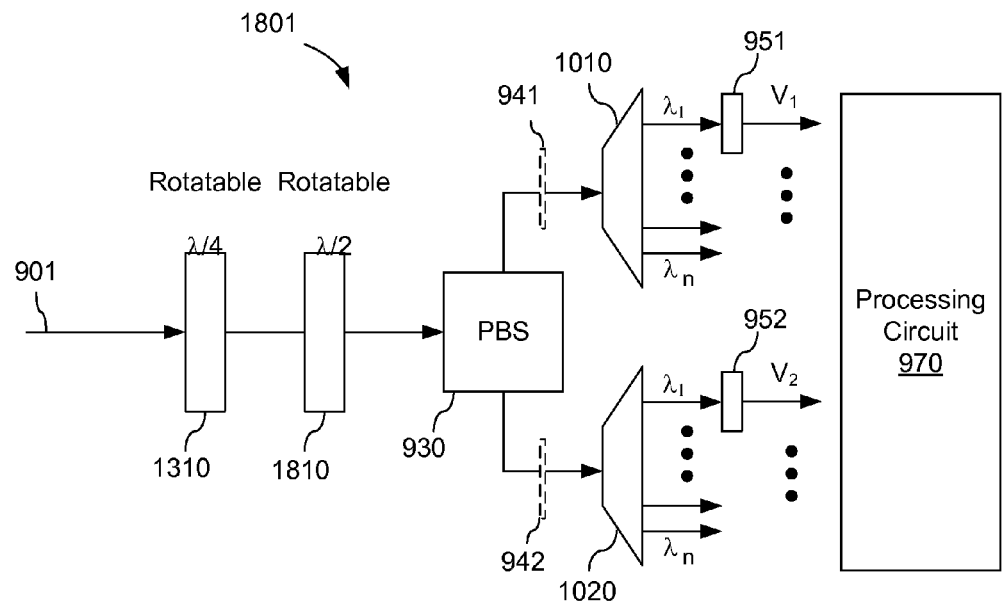
FIGS. 18A and 18B show two examples of WDM optical monitoring devices that use a rotatable quarter waveplate and a rotatable half waveplate as part of the device.
Figure 18B:
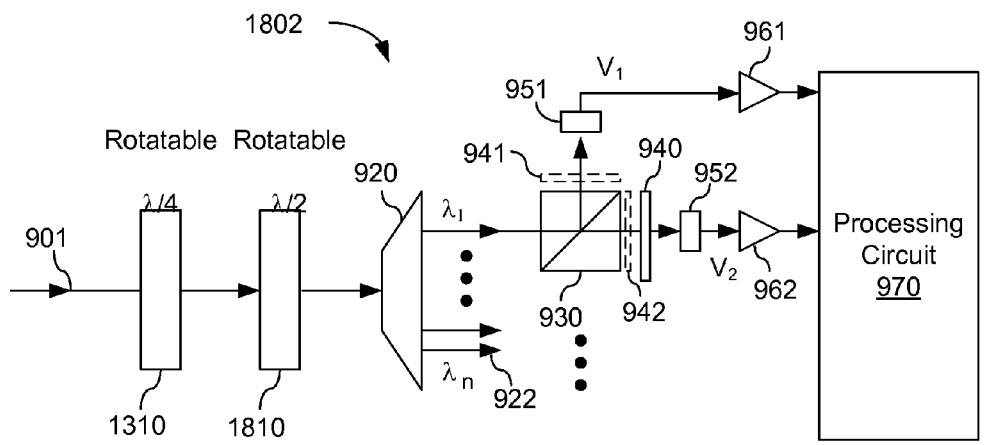
Figure 19A:
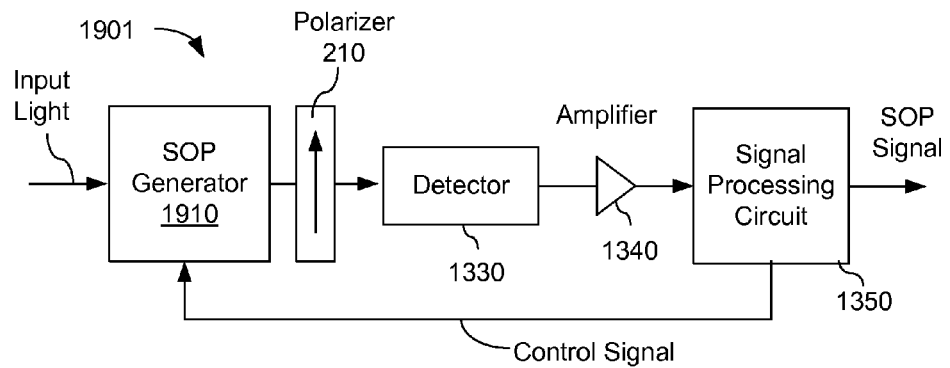
FIGS. 19A, 19B, 19C, 19D, and 19E illustrate examples of optical monitoring devices that use a SOP generator and a fixed optical polarizer.
Figure 19B:
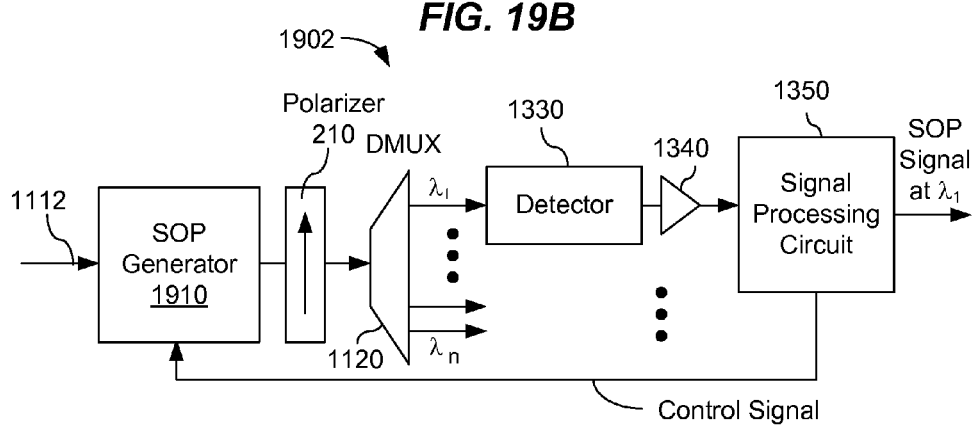
Figure 19C:
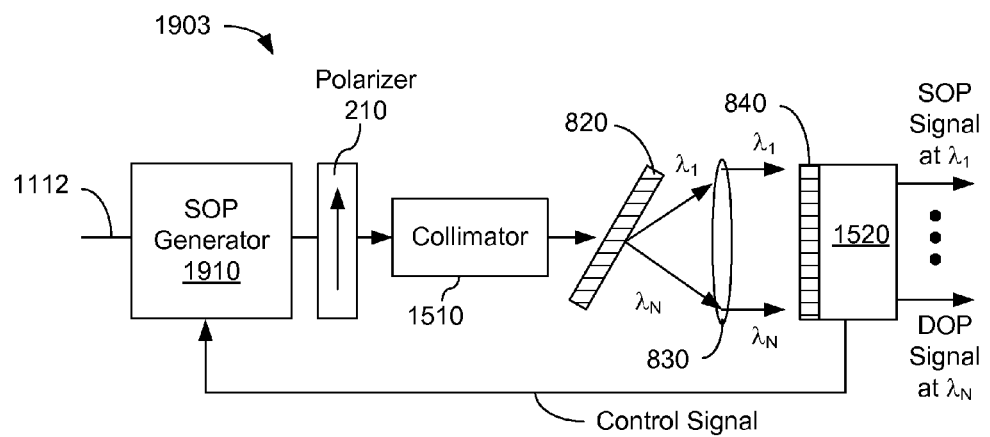
Figure 19D:
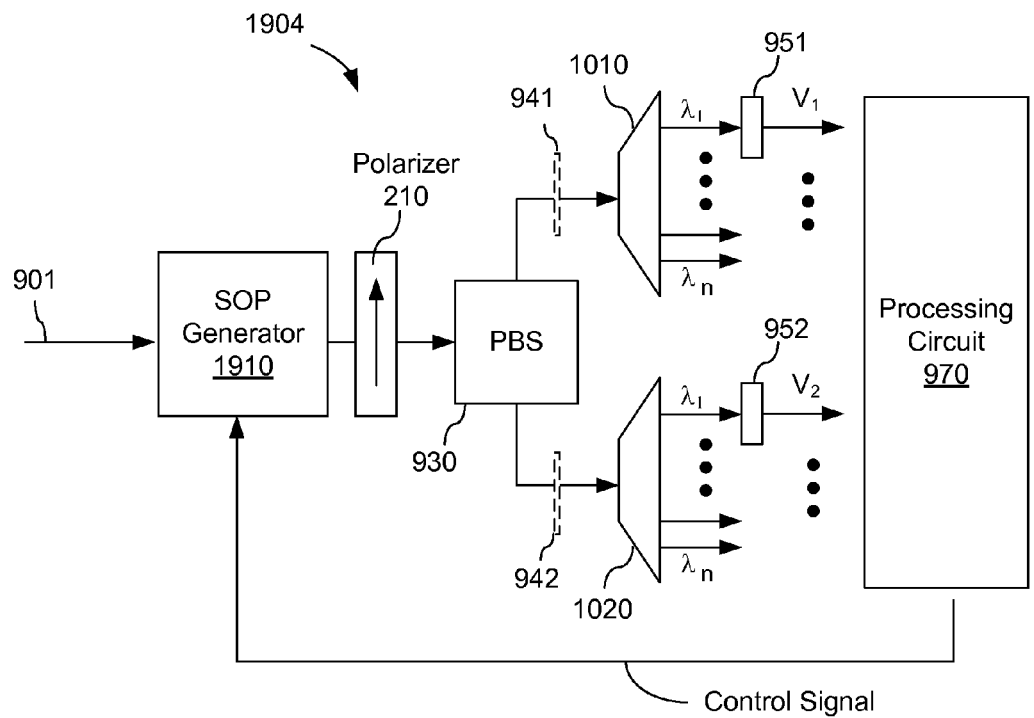
Figure 19E:
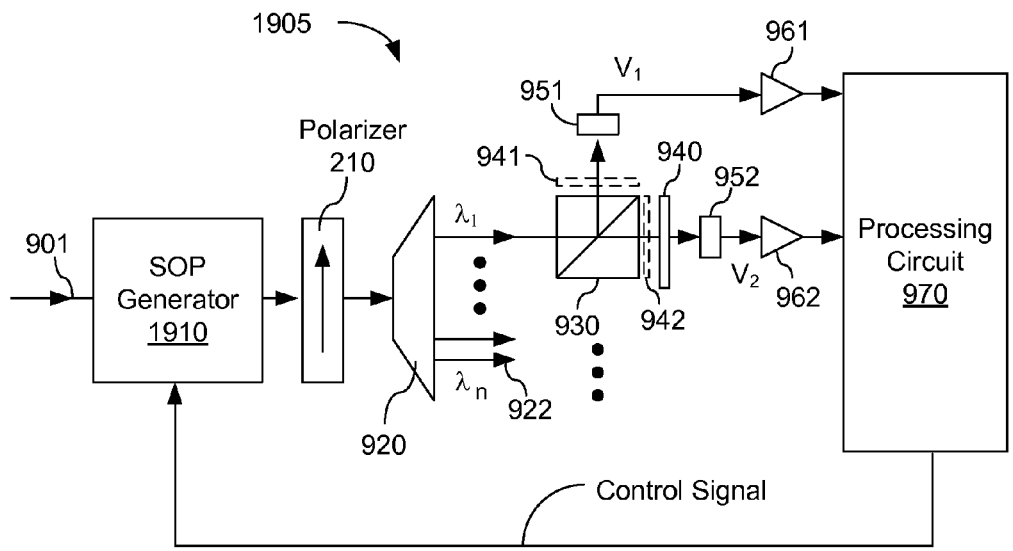

FIGS. 18A and 18B show two exemplary implementations 1801 and 1802 for providing independent monitoring of the signal to noise ratio (SNR) and DGD in WDM systems. In both systems, the input light is sequentially processed by a rotatable quarter-wave plate 1310 and a rotatable half-wave plate 1810. The waveplates 1310 and 1810 rotate at different rotation speeds. Also in both systems, each channel is split into two beams with orthogonal polarizations to have different power levels. In the system 1801, this is achieved by using two different demultiplexers 1010 and 1020 with different channel bandwidth. In the system 1802, a filter 940 is inserted in one of the two output beams to produce the difference. The processing techniques in connection with FIGS. 9 and 10 are applicable here.

In the above described examples shown in FIGS. 13, 14, 15, 18A and 18B, the polarization scrambler formed by the rotatable waveplate 1310 and the rotatable polarizer may be replaced by a SOP generator and a downstream fixed optical polarizer. The SOP generator may be used to manipulate the polarization of received light to produce any desired SOP.

FIGS. 19A, 19B, 19C, 19D, and 19E illustrate examples 1901, 1902, 1903, 1904, and 1905 of optical monitoring devices that use a SOP generator 1910 and a fixed optical polarizer 1920. The SOP generator 1910 may be configured to be adjustable to produce various SOPs. An external control signal may be used to control the SOP generator 1910 in producing SOPs.

Figure 20:
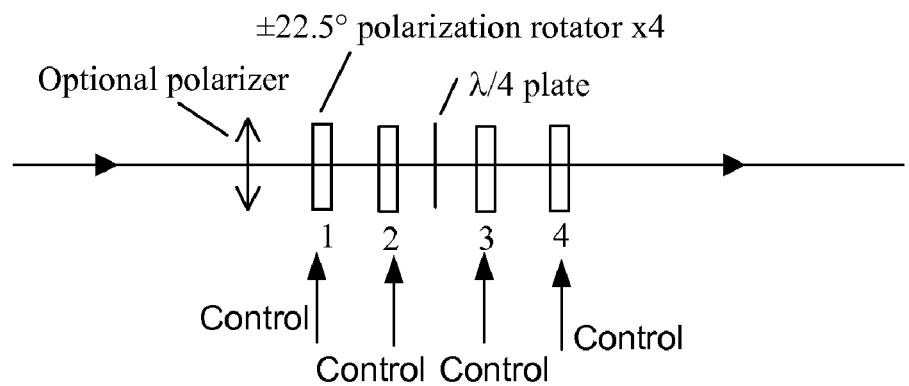
FIGS. 20 and 21 show exemplary implementations of a SOP generator.

FIG. 20 shows one example of a SOP generator. In this example, the SOP generator includes four controllable polarization rotators 1, 2, 3, and 4 that are sequentially placed in the optical path. A quarter waveplate is placed between the rotators 2 and 3. In addition, an optional input polarizer may be placed in front of the first rotator 1 for aligning the input polarization with respect to the optical axis (c-axis) of the λ/4 plate. The input polarizer may be oriented in various directions, e.g., aligned with the c-axis, or 45° from the c-axis, or other predetermined angle. Each of the polarization rotators in FIG. 20 may be individually controlled by a control signal as illustrated. Polarization rotations of the rotators are controlled to produce the desired SOPs at the output.

In one implementation, each polarization rotator may be a magneto-optic (MO) rotator to avoid any mechanical moving part in the SOP generator. This use of MO rotators or other polarization rotators without moving parts can improve the reliability and operating life of the device.

A polarization rotator, such as a MO rotator, suitable for the SOP generator in FIG. 20 may be designed to have the following properties: (1) When applying a positive voltage above saturation voltage Vsat (V≧+Vsat), the rotator rotates the SOP by +22.5°; (2) When applying a negative voltage above saturation voltage Vsat, (V≦−Vsat), the rotator rotates the SOP by −22.5°; (3) When rotators 1 and 2 (or 3 and 4) are rotated in the same direction, the net rotation of the pair of rotators 1 and 2 or rotators 3 and 4 is 45°; and (4) When rotators 1 and 2 (or 3 and 4) are rotated in the opposite directions, the net rotation of the pair is 0°.

Accordingly, this particular SOP generator can be used to generate at least the following states of polarization when the input SOP is linear and is aligned with the c-axis of the ¼ plate:

(1) Linear SOP at 0° when 1 & 2 are rotated at opposite directions and 3 & 4 are rotated at opposite directions;

(2) Linear SOP at +45° when rotators 1 and 2 are rotated at opposite direction, but rotators 3 and 4 are rotated by +22.5° each;

(3) Linear SOP at −45° when rotators 1 and 2 are rotated at opposite direction, but rotators 3 and 4 are rotated by −22.5° each;

(4) RHC (right hand circular) when rotators 1 and 2 are rotated by +22.5° each; and (5) LHC (left hand circular) when rotators 1 and 2 are rotated by −22.5° each.

TABLES 1 and 2 are logic tables for two configurations of the SOP generator in FIG. 20.

TABLE 1

Input SOP is aligned with quarter wave plate

| Rotator 1 | Rotator 2 | Rotator 3 | Rotator 4 | SOP |
|---|---|---|---|---|
| +22.5° | −22.5° | +22.5° | −22.5° | 0° linear |
| + | − | − | + | 0° linear |
| − | + | + | − | 0° linear |
| − | + | − | + | 0° linear |
| + | − | + | + | 45° linear |
| − | + | + | + | 45° linear |
| + | − | − | − | −45° linear |
| − | + | − | − | −45° linear |
| + | + | + | + | RHC |
| + | + | − | + | RHC |
| + | + | + | − | RHC |
| + | + | − | − | RHC |
| − | − | + | + | LHC |
| − | − | − | + | LHC |
| − | − | + | − | LHC |
| − | − | − | − | LHC |

TABLE 2

Logic table for SOP generation
(Input SOP is aligned 45° from c-axis of the quarter wave plate

| Rotator 1 | Rotator 2 | Rotator 3 | Rotator 4 | SOP |
|---|---|---|---|---|
| +22.5° | −22.5° | +22.5° | −22.5° | RHC |
| + | − | − | + | RHC |
| − | + | + | − | RHC |

TABLE 2-continued

Logic table for SOP generation
(Input SOP is aligned 45° from c-axis of the quarter wave plate

| Rotator 1 | Rotator 2 | Rotator 3 | Rotator 4 | SOP |
|---|---|---|---|---|
| − | + | − | + | RHC |
| + | − | + | + | RHC |
| − | + | + | + | RHC |
| + | − | − | − | RHC |
| − | + | − | − | RHC |
| + | + | + | + | 45° linear |
| + | + | − | + | 0° linear |
| + | + | + | − | 0° linear |
| + | + | − | − | −45° linear |
| − | − | + | + | 45° linear |
| − | − | − | + | 0° linear |
| − | − | + | − | 0° linear |
| − | − | − | − | −45° linear |

Figure 21:
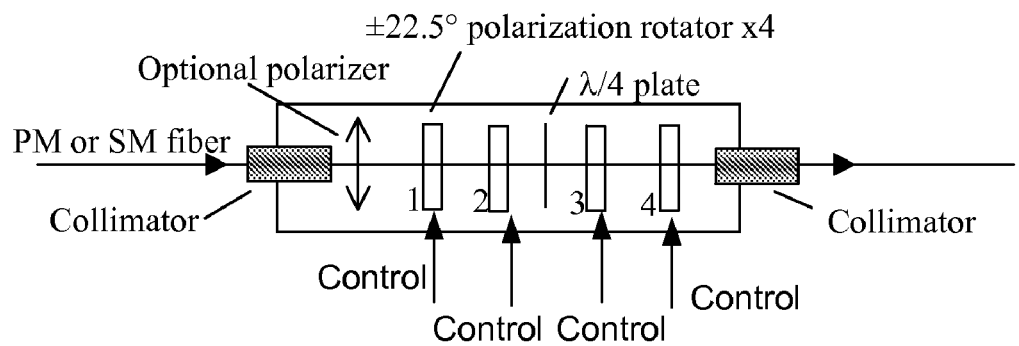

FIG. 21 shows an example of a packaged SOP generator based on the design in FIG. 20 where the generator is packaged or pigtailed with PM or single mode (SM) fibers. As illustrated, a housing may be used to hold the rotators and the waveplate along with the optional input polarizer. Two fiber collimators may be used at the input and output ports of the SOP generator and may be engaged to the input and output PM or SM fibers. The fibers may also be single mode PM fibers.

In operating the SOP generator in FIG. 20 or 21, the SOP of an input light signal may be determined by performing the following steps: 1) Insert a polarizer at 0° and measure the optical power after the polarizer; 2) Rotate the polarizer by 45° and measure the optical power after the polarizer; 3) Rotate the polarizer by 90 (or −45°) and measure the optical power after the polarizer; and 4) Insert a right-hand-circular (RHC) or left-hand-circular (LHC) polarizer and measure the optical power after the polarizer.

Alternatively, the SOP of the input optical signal may also be measured by the following steps: 1) Insert a polarizer at 0° and measure the optical power after the polarizer; 2) Rotate the SOP by 45° and measure the optical power after the polarizer; 3) Rotate the SOP by 90 (or −45°) and measure the optical power after the polarizer; and 4) Convert the SOP to RHC (or LHC) and measure the optical power after the polarizer.

Figure 22:
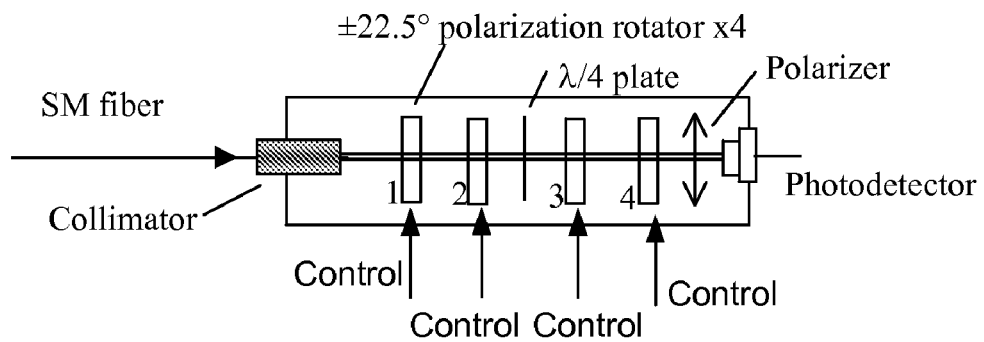
FIG. 22 shows a device that uses a SOP generator to measure the degree of polarization of light.

The above SOP generator can therefore be used to measure the SOP and DOP of the signal. FIG. 22 shows one exemplary setup for such a measurement. An output polarizer is placed at the output of the SOP generator and an optical detector is used to receive and measure the power of the output from the output polarizer. This SOP generator may be used to generate the required 4 polarization states for the polarizer to analyze.

These and other implementations, variations, modifications, and enhancements are possible.

What is claimed is:

1. A device, comprising:
a fiber loop;
an optical coupler in said fiber loop to couple input light into said fiber loop as two counter-propagating waves in said loop and to couple light in said loop out as an output beam;
a polarization device in said fiber loop to change polarization of light in said loop to achieve a maximum power level and a minimum power level in said output beam;
an optical detector to receive said output beam to produce a detector signal; and
a circuit to process said detector signal to produce an output indicative of a signal-to-noise ratio or a degree of polarization in said input light from said maximum and minimum power levels.

2. The device of claim 1, wherein the polarization device in said fiber loop comprises:
two or more fiber squeezers engaged to said fiber loop to squeeze fiber in said fiber loop; and
two or more controllers to control the corresponding two or more fiber squeezers to control squeezing directions of the two or more fiber squeezers.

3. The device of claim 2, wherein the two or more fiber squeezers are oriented to have an angle of 45 degrees between squeezing directions of two fiber squeezers.

4. The device of claim 1, wherein the polarization device in said fiber loop is configured to randomly scramble the polarization of the light in said fiber loop.

5. The device of claim 1, wherein the polarization device in said fiber loop is configured to control the polarization to vary through different states of polarization so as to achieve the maximum power level and the minimum power level in said output beam.

6. The device of claim 1, wherein the polarization device in said fiber loop is configured to be controlled in response to a control signal that adjusts a state of polarization of the light in said loop passing through the polarization device.

7. A device, comprising:
a polarization device to adjust polarization of received light to produce output light to find a maximum power level and a minimum power level of each WDM (wavelength division multiplexed) channel of different WDM channels in said received light;
a WDM demultiplexer to receive said output light and to separate different WDM channels in said output light;
a plurality of polarizers in optical paths of said different WDM channels, respectively;
a plurality of optical detectors to respectively receive said different WDM channels after transmission through said polarizers; and
a circuit to process output signals from said optical detectors to produce an output for each WDM channel indicative of a signal-to-noise ratio or a degree of polarization in said each WDM channel from said maximum power level and said minimum power level.

8. The device of claim 7, comprising:
a fiber line to guide the received light to the WDM demultiplexer, and
wherein the polarization device comprises:
two or more fiber squeezers engaged to the fiber line to squeeze the fiber line; and
two or more controllers to control the corresponding two or more fiber squeezers to control squeezing directions of the two or more fiber squeezers.

9. The device of claim 7, wherein the polarization device is configured to randomly scramble the polarization of the light.

10. The device of claim 7, wherein the polarization device is configured to control the polarization to vary through different states of polarization so as to achieve the maximum power level and the minimum power level.

11. The device of claim 7, wherein the polarization device is configured to be controlled in response to a control signal that adjusts a state of polarization of the light passing through the polarization device.

* * * * *

UNITED STATES PATENT AND TRADEMARK OFFICE
CERTIFICATE OF CORRECTION

PATENT NO. : 8,000,610 B2  
APPLICATION NO. : 12/145474  
DATED : August 16, 2011  
INVENTOR(S) : Xiaotian Steve Yao Page 1 of 1

It is certified that error appears in the above-identified patent and that said Letters Patent is hereby corrected as shown below:

Title Page, in Field (57), under "ABSTRACT" in Column 2, Line 3, please delete "signal to noise" and insert -- signal-to-noise --, therefor.

On Title Page 3, in Field (56), under "OTHER PUBLICATIONS", in Column 2, Line 23, please delete "Technolology," and insert -- Technology, --, therefor.

In Column 4, Line 65, please delete "Vman and Vmin," and insert -- $V_{max}$ and $V_{min}$, --, therefor.

In Column 6, Line 63, please delete "the an" and insert -- an --, therefor.

In Column 11, Line 46, after "polarizer" insert -- 1320 --, therefor.

In Column 12, in Table 1, under "Rotator 3", Line 1, please delete "+22 5°" and insert -- +22.5° --, therefor.

In Column 14, Line 20, in Claim 5, please delete "different" and insert -- all possible --, therefor.

Signed and Sealed this  
Tenth Day of July, 2012

David J. Kappos  
*Director of the United States Patent and Trademark Office*